United States Patent [19]

Cole

[11] Patent Number: 5,128,906
[45] Date of Patent: Jul. 7, 1992

[54] DEEP PENETRATING SHEAR-WAVE SEISMIC VIBRATORY SOURCE FOR USE IN MARINE ENVIRONMENTS

[75] Inventor: Jack H. Cole, Ponca City, Okla.

[73] Assignee: Conoco Inc., Ponca City, Okla.

[21] Appl. No.: 712,171

[22] Filed: Jun. 6, 1991

[51] Int. Cl.⁵ .............................................. G01V 1/14
[52] U.S. Cl. ..................................... 36/143; 367/75; 181/120; 181/114; 181/401
[58] Field of Search .................. 367/143, 173, 189, 75; 181/109, 110, 113, 114, 119, 120, 121, 401; 175/1, 5, 6, 8, 10, 86, 9, 219; 166/352-356

[56] References Cited

U.S. PATENT DOCUMENTS

| | | | |
|---|---|---|---|
| 3,504,756 | 4/1970 | Bodine | 181/401 X |
| 3,685,608 | 8/1972 | Hamilton | 181/114 X |
| 4,336,843 | 6/1982 | Petty | 166/354 X |
| 4,405,036 | 9/1983 | Wener et al. | 181/110 |
| 4,705,137 | 11/1987 | Fair | 181/120 |
| 4,730,092 | 3/1988 | Fair et al. | 181/120 X |
| 4,735,280 | 4/1988 | Cole | 181/113 |
| 4,867,096 | 9/1989 | Cole | 181/114 |
| 5,031,718 | 7/1991 | Peavey | 181/117 |

*Primary Examiner*—Brian S. Steinberger

[57] ABSTRACT

A method and apparatus for providing shear waves in a marine environment in which a shear wave source penetrates the surface sediment of a water bottom. The shear wave generating source includes an actuator/reaction mass system mounted inside a structural ring of a housing section. A cross-shaped structure at the top of the apparatus serves as a passive reaction mass and as a moment arm support for reversibly motor driven propellers enclosed in shrouds at the outer ends of the structure. A thruster system provides dynamic positioning. The cross-shaped structure and housing section are connected by a structurally stiff member, such as a vertical tube. Pistons provide actuation against a reaction mass located within the housing structure, and motion of the housing structure generates shear waves which propagate in the subsurface formations.

16 Claims, 3 Drawing Sheets

DEEP PENETRATING SHEAR-WAVE SEISMIC VIBRATORY SOURCE FOR USE IN MARINE ENVIRONMENTS

BACKGROUND OF THE INVENTION

1. Field of the Invention

The present invention pertains to seismic wave generation and more particularly to the generation of seismic shear waves in an ocean bottom marine environment.

2. Related Prior Art

Oil exploration has become increasingly concerned with the location of oil reservoirs situated beneath the ocean floor. Prior art has developed several types of methods and apparatus to accomplish location of subsea oil reservoirs. Primarily, ocean seismic exploration has been centered around generating seismic compression waves from ships through the use of air guns. It would further aid exploration for petroleum if shear waves could also be generated at the ocean bottom. However, the generation of seismic shear waves in marine environments where the water bottom is not rigid enough to sustain shearing stresses has been extremely difficult. In general, prior art has regarded this problem too difficult and has ignored trying to resolve it. The following patents illustrate much of the technology relating to the generation of seismic shear waves on the ocean floor.

U.S. Pat. No. 3,504,756, "Method for Providing Efficient Sonic Coupling to the Earth in a Seismic Survey System", (Bodine), relates to high level sonic energy which is mechanically generated by an orbiting mass oscillator, and is coupled to an elongated rod member to cause longitudinal vibration of the rod member, with little or no transverse vibration. The rod member has an anchor at one end, which is tightly driven into the ground by rotational drive, which rotates the rod member about it longitudinal axis. The longitudinal vibration energy, which is along an axis substantially normal to the torsional drive, facilitates the driving of the rod member, but does not interfere with the tightness of the coupling to the earth. The sonic energy passes into the ground and is reflected back by the strata to a receptor rod member coupled to the earth, where the energy is detected by means of a transducer.

U.S. Pat. No. 3,685,608, "Method and Apparatus for Airborne Seismic Exploration", (Hamilton), relates to an apparatus for seismic operation in which a seismic energy source is constructed and arranged to be supported from a cable carried by a helicopter. The source is gradually lowered to rest on the earth's surface at each selected location, while the helicopter hovers above. The seismic energy source is positively anchored to the earth's surface, in order to impart a seismic input into the earth, and is activated by remote control from the helicopter.

U.S. Pat. No. 4,405,036, "Seafloor Velocity and Amplitude Measurement Apparatus Method", (Wener, et al.), relates to an apparatus and method for measuring the velocity and amplitude of a pressure wave from an acoustic pulse through layers of sediment located below the mud line of the seafloor. The apparatus includes an implosive seismic source for injecting acoustic pulses into a region of the sediments, a plurality of vertically spaced sensors and a digital recording system for recording the signals from the sensors. The plurality of vertically spaced sensors are located vertically below the seismic source for sensing when the pressure waves from the acoustic pulses impact the sensor.

U.S. Pat. No. 4,705,137, "Marine Shear Wave Vibrator", (Fair), relates to an underwater vibrator apparatus for generating a shear wave into the consolidated seabed. The vibrator apparatus has a housing, a horizontally mounted mass attached to the housing for movement along an axis substantially parallel to the surface of the earth, and hydraulic apparatus for oscillating the mass along the axis. The sidewalls and bottom form a wedge shaped surface with an angled surface of the wedge shaped surface transverse to the movement of the mass. As the mass oscillates the underwater vibrator against the consolidated bottom, the vibrator will settle into the bottom.

U.S. Pat. No. 4,735,280, "Seismic Shear Wave Vibrator with Telescoping Blade", (Cole), relates to a type of shear wave vibrator, carried by a support vehicle and utilizing telescoping tubes for energy engagement within an underlying earth medium. The device consists of a jack assembly supporting a shear wave vibrator relative to a suitable carrier vehicle in a vibrational isolated manner. The vibrator structure consists of a pair of parallel, elongatable telescoping blades for earth penetration and engagement with a passive reaction mass pivotally secured across the top portion of the telescoping blades. The vibrator structure also includes an active mass/vibrator system pivotally secured across the lower portion of the telescoping blades adjacent the earth surface.

SUMMARY OF THE INVENTION

The present invention provides a method and apparatus for providing shear waves in a marine environment in which a shear wave source penetrates the surface sediment of a water bottom. The shear wave generating source includes an actuator/reaction mass system mounted inside a conically tipped structural ring of a housing section. A cross shaped structure at the top of the apparatus serves as a passive reaction mass and as a moment arm support for reversibly motor driven propellers enclosed in shrouds at the outer ends of the cross shaped structure. A thruster system provides dynamic positioning. The cross shaped top structure and bottom housing section are connected by a structurally stiff member, such as a vertical tube. Pistons provide actuation against a reaction mass located within the bottom housing structure, and the opposing motions of the reaction mass and housing structure generate shear waves which propagate in the subsurface formations.

DESCRIPTION OF THE PREFERRED EMBODIMENT

The present invention provides a method and apparatus that allows the direct generation of seismic vibratory shear waves in marshes, marine environments with soft sediment bottoms, and in soft surface areas where shear wave VIBROSEIS systems cannot effectively couple to the earth.

Figure 1:
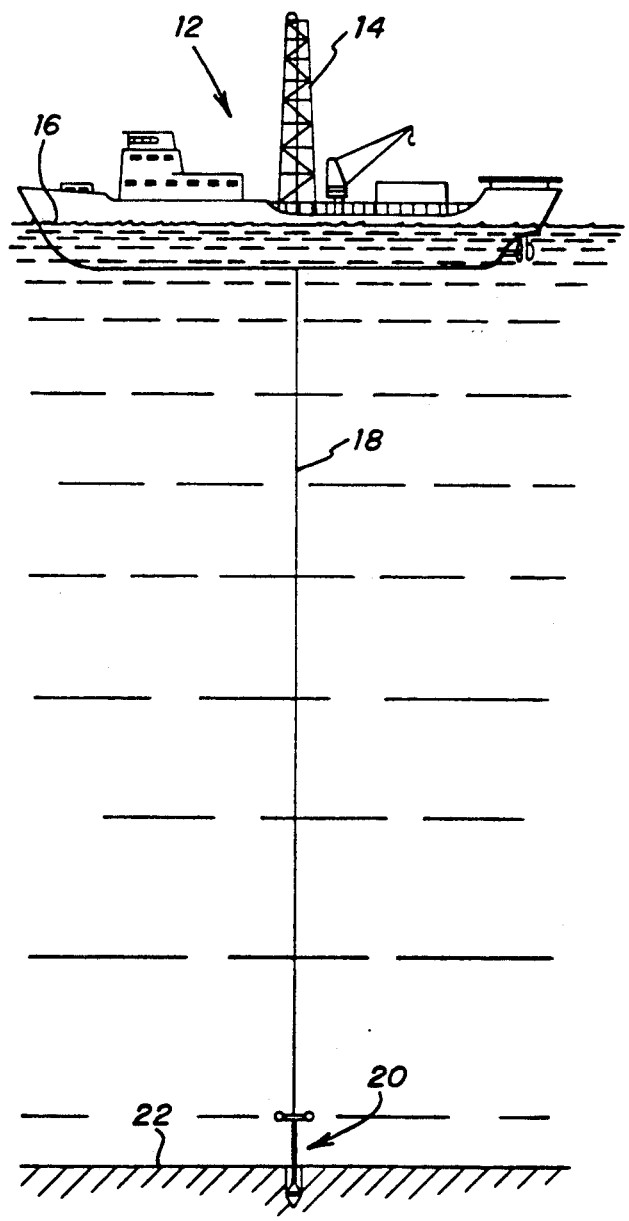
FIG. 1 is a plan view of an implementation system for an on bottom seismic shear wave source.

An envisioned implementation of the present invention is illustrated in FIG. 1. A drill ship, barge, or other dynamically positioned surface vessel 12 containing a draw works 14 is located at the water surface 16. An umbilical 18, consisting of a tension strength member, power conductor(s), and signal transmission cable (see FIG. 2) extends from draw works 14 downward to a vibratory seismic source 20, which is shown penetrating the water bottom sediment 22. Source 20 is conceptually illustrated in greater detail in FIGS. 2 through 4.

Figure 2:
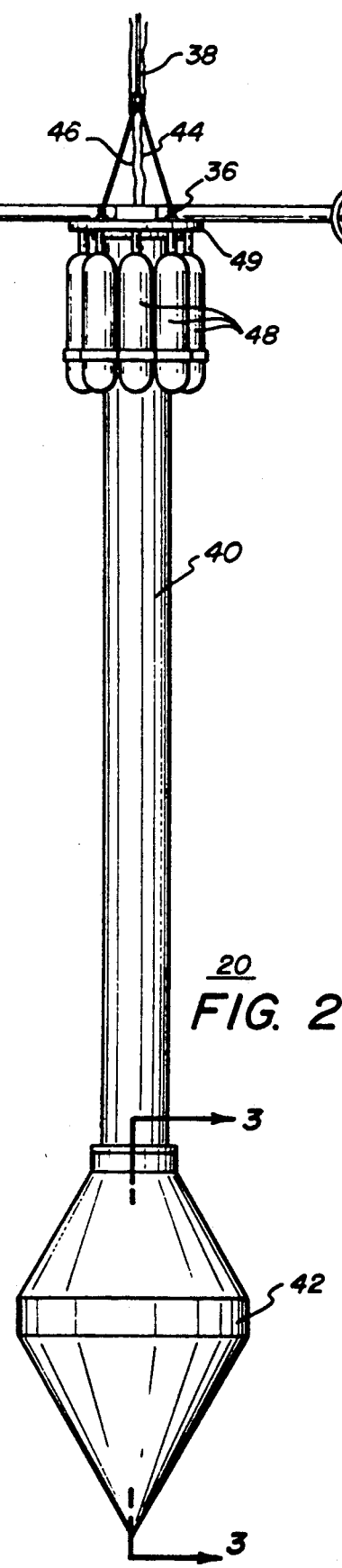
FIG. 2 is a side view of a deep penetrating shear wave seismic vibratory source.
Figure 3:
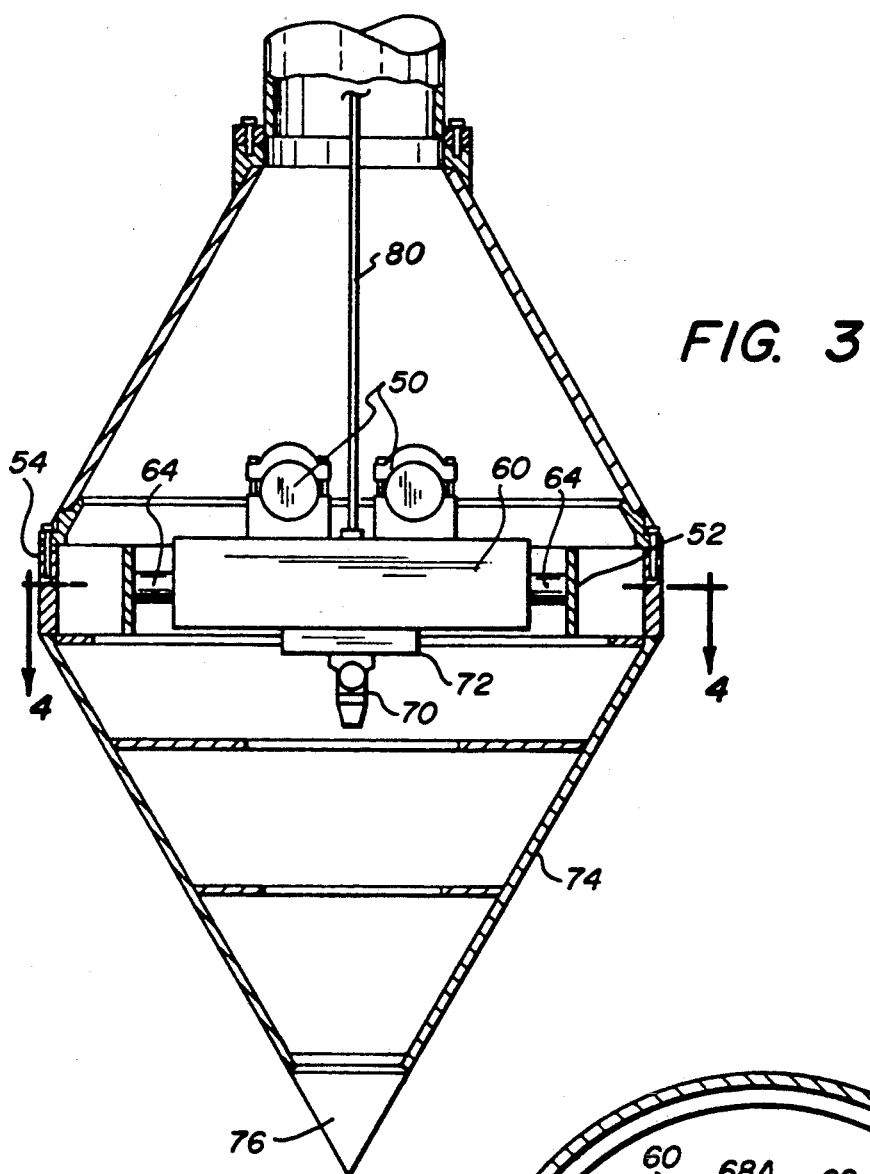
FIG. 3 is a cross sectional view along lines 3—3 of the bottom portion of the vibratory source of FIG. 2.
Figure 4:
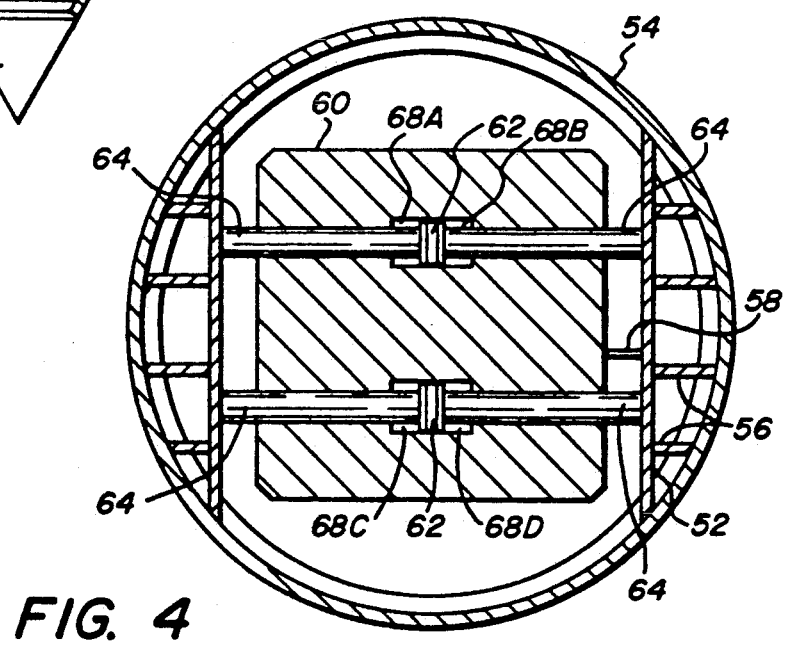
FIG. 4 is a top view of FIG. 3 taken along lines 4—4.

The embodiment of the present invention illustrated in FIGS. 2 through 4 is capable of penetrating about thirty feet of sediment. However, larger versions with much greater penetrating capacity could readily be designed and built following the teachings of the present invention.

Referring now to FIG. 2, an external view of vibratory seismic source assembly 20 is illustrated. A passive reaction mass 28 having a cross shaped structure 30 at the top serves as a moment-arm support for reversible motor driven propellers 32 (thrusters) enclosed in shrouds 34 at the outer ends of the structure. Thrusters 32 provide dynamic positioning for vibratory seismic source 20 under the direction of an automatic control system (not shown) contained within vibratory seismic source 20 or on board surface vessel 12 shown in FIG. 1. Cross shaped structure 30 also contains lifting lugs 36 to which a tension strength member 38, part of umbilical 18, is attached. The variables controlled by dynamic positioning include tube tilt, which is ideally zero with respect to the vertical axis of vertical tube 40, and a predetermined azimuthal orientation. Suitable transducers for detecting azimuth and tilt may be mounted within the apparatus and are not shown.

Vertical tube 40 extending between top cross shaped structure 30 and conic housing 42 is a lightweight but structurally stiff member with a fundamental natural frequency well above the highest frequency produced by vibrator 20. Ideally, the tube would be graphite/epoxy or some other composite material.

For shallow water operations, umbilical 18 could contain hydraulic lines 44 to deliver fluid power from surface vessel 12 down to vibrator 20. In deeper water, electrical power would be delivered through power conductors 46 in umbilical 18 down to an electric motor (not shown), mounted in the upper end of vertical tube 40. A self contained hydraulic power pack would be mounted within the upper end of vertical tube 40 and would consist of an electric motor driven pump, reservoir, filters, valves and plumbing. A bank of accumulators 48 attached to a hydraulic manifold 49 could be used for storing energy between sweeps. Thruster motors 32 could be either electrical or hydraulic.

The details of vibratory actuator/reaction mass system contained in conic housing 42 are illustrated in FIGS. 3 through 6. Desurgers 50 are the same as those used on marine VIBROSEIS and are used to reduce the effects of hydraulic fluid pulsations. Shafts 64 are attached to brace 52 which is attached to structure 54 by members 56 as shown in FIG. 4, the top view of FIG. 3. A linear variable differential transformer (LVDT) 58 provides position feedback.

The actual force is generated by reaction mass 60 being forced back and forth through the action of pistons 62 connected to piston shafts 64. Hydraulic fluid 66 is contained in cavities 68A, 68B, 68C and 68D and is directed into these cavities by electro-hydraulic valve 70 through manifold 72. Although only one servovalve 70 feeding one manifold is illustrated, each piston 62 may have its own servovalve and fluid hydraulic system.

Housing 42 consists of a structurally reinforced conic section 74 having a hardened steel tip 76. At the base of conic section 74 is a structural ring 54 which is used to add strength at the point where reaction mass 60 is operating.

In operation, the fluid pressure on pistons 62 force conic section 74 in one direction and then the opposite direction. The motions of reaction mass 60 will of course be one hundred eighty degrees out of phase with respect to the motions of conic housing 42. The force acting against housing 42 will be equal in magnitude, but opposite in direction to the force acting against reaction mass 60.

While actuator/reaction mass 60 is shown mounted inside a structural ring 54 forming structurally reinforced conic housing 42, other housing shapes, such as a wedge or spherical bulb, are possible.

Tension rod 80 shown in FIG. 3 is an optional member. Its purpose is to provide vertical support for reaction mass 60 and hence remove most of the sliding load placed on piston shafts 64. However, piston shafts 64 can support reaction mass 60 without rod 80.

The actuation system illustrated in FIG. 3 delivers a peak output force of at least thirty thousand pounds. The force output can be doubled by stacking two actuation systems as illustrated in FIGS. 5 and 6.

Figures 5, 6, 7:
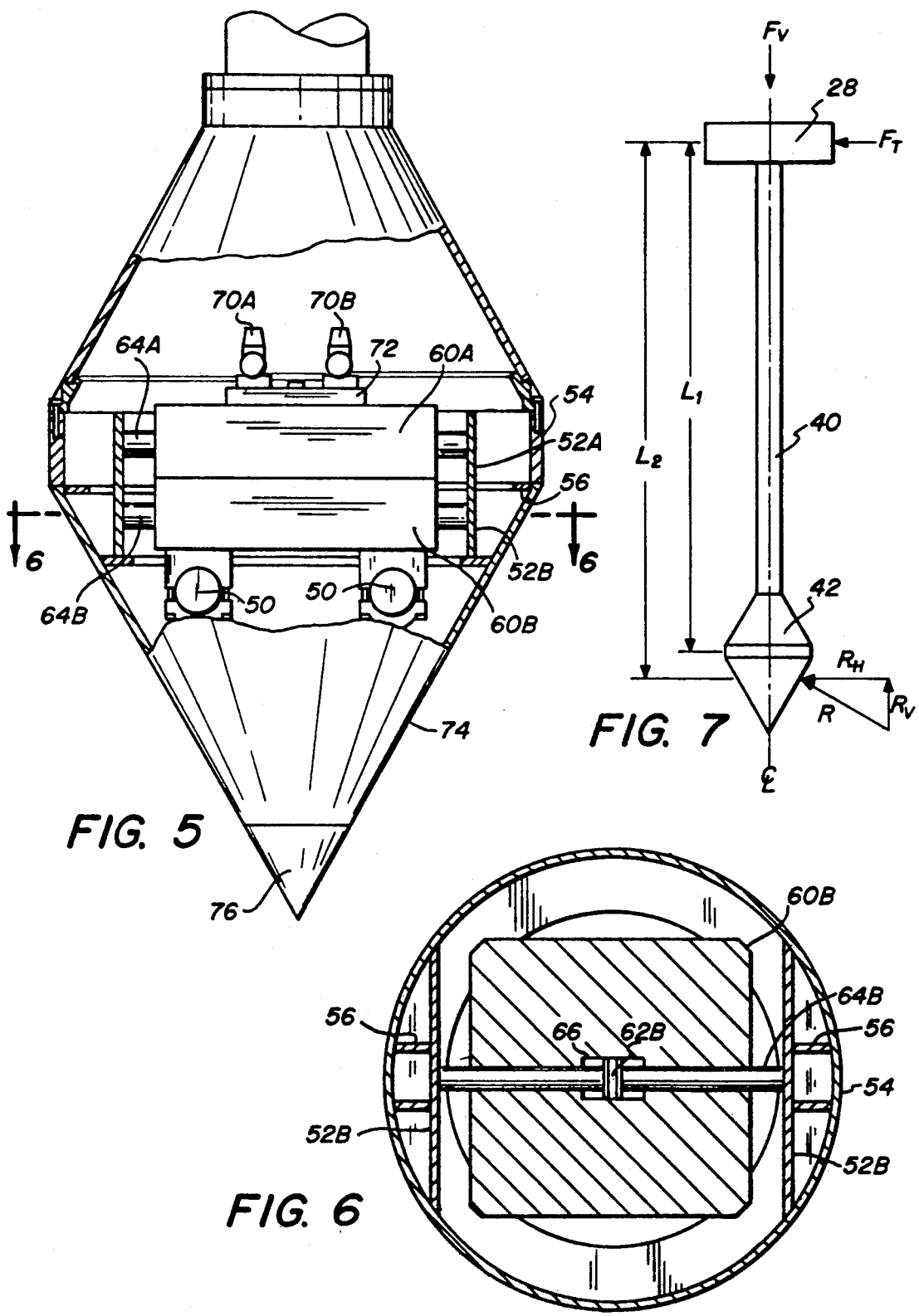
FIG. 5 is an alternative cross sectional view along lines 3—3 of the bottom portion of the vibratory source of FIG. 2.
FIG. 6 is a top view of FIG. 5 taken along lines 6—6.
FIG. 7 is a force diagram of the on bottom seismic shear wave source of FIG. 1.

In FIGS. 5 and 6 the same numbers have been used to identify similar parts for simplification. Each of dual reaction masses 60A and 60B has a single driving piston 62A and 62B with associated piston shafts 64A and piston shafts 64B respectively. Reaction mass 60B is illustrated as being located below structural ring 54. Brace 52 is extended to provide support for both reaction mass 60A and 60B.

The purpose of passive top reaction mass 28 is to provide a force balance to vibrator apparatus 20. FIG. 7 is a force balance diagram for this apparatus. $F_B$ is the horizontal force applied by the actuator in reaction mass 60 to the structural ring 54 in conic housing 42. The earth reacts on conic section 74 with a resultant force, R, which may be resolved into a horizontal component, $R_H$, and a vertical component, $R_V$. $R_V$ is reacted by the downward resultant weight $F_V$ of the entire vibrator apparatus. $F_V$ is designed to be greater than $R_V$.

Summing moments about the center of gravity of top reaction mass 28 shows that $R_H = F_B \times L_1/L_2$. Summing forces in the horizontal direction yields $$F_T = F_B \left[ 1 - \frac{L_1}{L_2} \right]$$

$F_T$ is produced by the top of vertical tube 40 acting against top reaction mass 28 and is equal to this mass multiplied by its horizontal acceleration. Additional reactive forces are imposed against top reaction mass 28 and vertical tube 40 by the drag forces caused by the vibratory motion of the structure through the surrounding water. However, the drag forces are small because of low relative velocities and can be neglected, leaving the diagram of FIG. 7 a close approximation.

Since $L_1$ is nearly equal to $L_2$, the term in the brackets of the above equation is small, which means that $F_T$ is small, and lateral displacement of top reaction mass 28 will be small. The vibrator apparatus of the present invention is driven by variable frequency sweeps just as are surface VIBROSEIS systems.

It should be noted that since the displacement of top reaction mass 28 is small relative to the displacement of conical tip 76, a slight rocking action of tip 76 may occur at low frequencies. This is not believed to be significant. However, any such rocking effects can be totally eliminated by using a spherical housing at the bottom in lieu of conical tip 76 on housing 42.

While there has been illustrated and described a particular embodiment of the present invention, it will be appreciated that numerous changes and modifications will occur to those skilled in the art, and it is intended in the appended claims to cover all those changes and modifications which fall within the true spirit and scope of the present invention.

What is claimed is:

1. An apparatus for providing shear waves in a marine environment in which a shear wave source penetrates the surface sediment of a water bottom comprising:
   a housing means having a structural ring section for penetrating surface sediments;
   reaction mass means contained within said housing means by said structural ring section for generating shear waves which propagate in subsurface formations;
   a vertical member attached at one end to the top of said housing means;
   cross shaped structure means fixed to an other end of said vertical member for serving as a passive reaction mass;
   motor driven propeller means enclosed in shrouds located at the outer ends of said cross shaped structure for providing dynamic positioning; and
   piston means located within said reaction mass means for providing actuation of said reaction mass.

2. The apparatus according to claim 1 wherein said housing means includes an external conic shaped structure having a hardened steel tip.

3. The apparatus according to claim 1 wherein said piston means includes a dual piston and cylinder arrangement with a hydraulic system for pumping hydraulic fluid to move each piston within each cylinder.

4. The apparatus according to claim 3 wherein said piston means includes an electrically driven hydraulic system for pumping hydraulic fluid in said piston means.

5. The apparatus according to claim 3 wherein said piston means includes a connection to an umbilical line to a remote source for pumping hydraulic fluid in said piston means.

6. The apparatus according to claim 1 wherein said reaction mass means includes a first and a second reaction mass, and a first and a second two piston means, one located in each of said first and said second reaction mass.

7. The apparatus according to claim 6 wherein said housing means includes an external conic shaped structure having a hardened steel tip.

8. The apparatus according to claim 6 wherein each said of said first and said second piston means includes a dual piston and cylinder arrangement with a hydraulic system for pumping hydraulic fluid to move each said piston within each said cylinder.

9. The apparatus according to claim 8 wherein each of said first and said second piston means includes an electrically driven hydraulic system for pumping hydraulic fluid in each of said first and said second piston means.

10. The apparatus according to claim 8 wherein each of said first and said second piston means includes a connection to an umbilical line to a remote source for pumping hydraulic fluid in said piston means.

11. An apparatus for providing shear waves in a marine environment in which a shear wave source penetrates the surface sediment of a water bottom comprising:
    a housing means having a structural ring section and an external conic shaped structure with a hardened steel tip for penetrating surface sediments;
    reaction mass means contained within said housing means by said structural ring section for generating shear waves which propagate in subsurface formations;
    a vertical member attached at one end to the top of said housing means;
    cross shaped structure means fixed to an other end of said vertical member for serving as a passive reaction mass;
    motor driven propeller means enclosed in shrouds located at the outer ends of said cross shaped structure for providing dynamic positioning; and
    piston means having a dual piston and cylinder arrangement with a hydraulic system for pumping hydraulic fluid to move said piston within said cylinder, said piston means located within said reaction mass means for providing actuation of said reaction mass.

12. An apparatus for providing shear waves in a marine environment in which a shear wave source penetrates the surface sediment of a water bottom comprising:
    a housing means having a structural ring section and an external conic shaped structure having a hardened steel tip for penetrating surface sediments;
    reaction mass means, including a first and a second reaction mass, contained within said housing means by said structural ring section for generating shear waves which propagate in subsurface formations;
    a vertical member attached at one end to the top of said housing means;
    cross shaped structure means fixed to an other end of said vertical member for serving as a passive reaction mass;
    motor driven propeller means enclosed in shrouds located at the outer ends of said cross shaped structure for providing dynamic positioning; and
    piston means having a first and a second piston means, one located in each of said first and said second reaction mass, each said of said first and said second piston means includes a dual piston and cylinder arrangement with a hydraulic system for pumping hydraulic fluid to move each said piston within each said cylinder means, said piston means for providing actuation of said reaction mass.

13. A method for providing shear waves in a marine environment in which a shear wave source penetrates the surface sediment of a water bottom comprising the steps of:

penetrating surface sediments using a housing means having a structural ring section;

generating shear waves which propagate in subsurface formations using a reaction mass means contained within said housing means;

providing a vertical member attached at one end to the top of said housing means with a cross shaped structure means fixed to an other end of said vertical member for serving as a passive reaction mass;

positioning said housing means by actuating motor driven propeller means enclosed in shrouds located at the outer ends of said cross shaped structure; and actuating said reaction mass means by a piston means located within said reaction mass means.

14. The method according to claim 13 wherein said actuation step includes pumping hydraulic fluid to move a piston within a cylinder with a hydraulic system.

15. The method according to claim 14 wherein said pumping step includes electrically driving said hydraulic system.

16. The method according to claim 14 wherein said pumping step includes connecting to an umbilical line to a remote source for pumping hydraulic fluid.

* * * * *